United States Patent Office 3,077,597
Patented Feb. 12, 1963

3,077,597
MEANS FOR MAINTAINING ANGULAR RESOLUTION IN A SIGNAL DIRECTION FINDER
Warren M. Macek, Huntington Station, N.Y., assignor to Sperry Rand Corporation, a corporation of Delaware
Filed Oct. 21, 1959, Ser. No. 847,777
8 Claims. (Cl. 343—114.5)

The invention generally relates to a pulsed signal direction finder receiver and, more particularly, to means for maintaining in such a receiver predetermined angular resolution irrespective of the strength of the incoming pulsed signals.

Certain of the prior art signal direction finder receivers are equipped with a continuously scanning directional antenna. Assuming a distant source of incident pulses of electromagnetic energy, a group of pulses is produced in the direction finder receiver each time that its directional antenna scans by the azimuth of the signal source. The number of pulses in each group depends upon the pulse repetition rate of the signal source, the azimuth scanning rate of the direction finder antenna, the beam pattern of the direction finder antenna and the amplitude of the incoming signals.

Accordingly, as the distance between the direction finder antenna and the signal source decreases, for example, (such as where the direction finder is located on a moving vehicle), the number of pulses in each group of detected pulses increases.

The detected pulses may actuate a visual indicator, driven in synchronism with the scanning antenna, for displaying the azimuth of the signal source. In such a case, the number of pulses in each group of detected pulses determines the length of time that the visual indicator is actuated. The length of the actuation time in turn establishes the resolution of the indicator display.

It is a principal object of the present invention to provide means for maintaining predetermined angular resolution in a pulsed signal direction finder receiver irrespective of the amplitude of the incoming pulsed signals.

Another object is to vary the gain of a scanning direction finder receiver as a function of the number of detected pulses in excess of a predetermined number.

Another object is to provide means for maintaining constant the number of detected pulses produced in a continuously scanning directional receiver.

These and other objects of the present invention, as will appear more fully upon a reading of the following specificaion, are accomplished by the provision of means for varying the gain of a direction finder receiver in a special manner.

The direction finder is equipped with a continuously scanning directional antenna adapted to receive pulsed microwave signals from a distant source whose bearing is to be determined. Groups of detected pulses are produced at the output of the directional finder receiver, each group recurring at the antenna scanning rate. The pulses in each group of pulses recur at the pulse repetition rate of the distant microwave source.

Means are provided for counting the number of pulses within each group of detected pulses and for producing an output signal related to the number of detected pulses in excess of a predetermined number. The output signal is applied to the direction finder receiver to vary the gain thereof. As the number of excess detected pulses increases, the gain of the receiver is reduced. The effect of such gain reduction is to maintain relatively constant the number of pulses in each detected group of pulses. The stabilization of the number of pulses in each group serves to maintain relatively constant the angular resolution of the direction finder system.

For a more complete understanding of the present invention, reference should be had to the following specification and to the appended figures of which:

Figure 1:
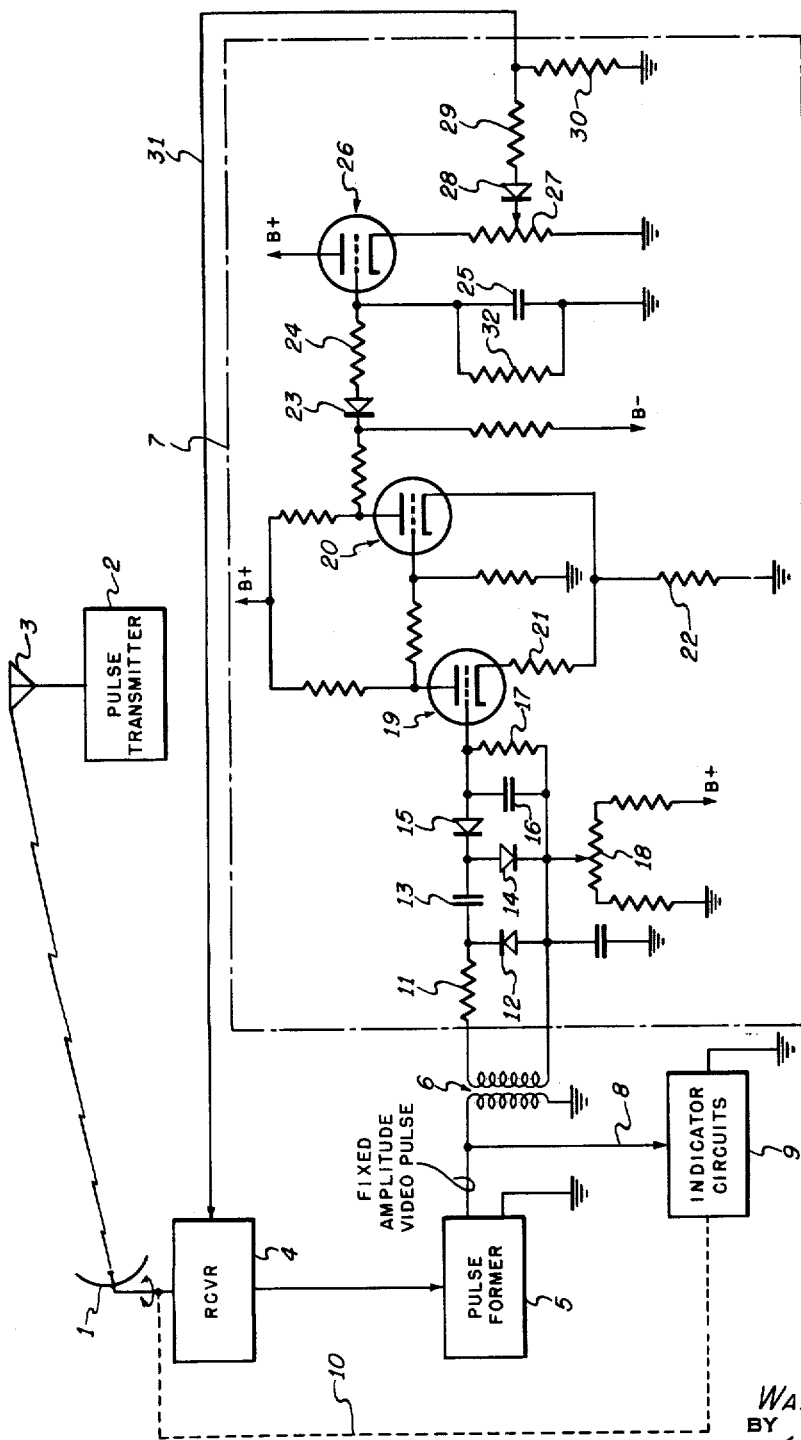
FIG. 1 is a preferred embodiment of the present invention.

FIG. 1 represents a typical signal directional finder system which is adapted, in accordance with the present invention, for the maintenance of substantially constant angular resolution of indicator circuits 9. Signal source 2 includes a source of regularly repetitive pulsed microwave signals which are radiated by antenna 3. The radiated signals are received by antenna 1 and detected within conventional receiver 4. The video signals at the output of receiver 4 are converted by pulse former 5 into pulses of fixed amplitude and duration. Pulse former 5, for example, may comprise a blocking oscillator. The fixed amplitude and fixed duration of the video pulses at the output of pulse former 5 are coupled by transformer 6 to the input of automatic gain control 7. The same video pulses are also applied via line 8 to indicator circuits 9.

The specific nature of indicator circuits 9 is not material to the present invention and for that reason is not shown in detail. It essentially includes means synchronized with the azimuth scanning movement of antenna 1 and means responsive to the video pulses at the output of pulse former 5 for indicating the relative bearing of the pulsed microwave signals received from transmitter 2. Thus, indicator circuits 9 may comprise, for example, a cathode ray tube whose deflection yoke is synchronously rotated with antenna 1 by means of linkage 10. Deflection circuits (not shown) are included for the radial deflection of the tube beam at some convenient rate. Means (not shown) are also provided to "stretch" the duration of the video pulses applied by line 8. A "box car" detector could be used for the latter purpose. In operation, an intensified radial display is produced upon the face of the cathode ray tube at a relative azimuth angle depending upon the direction of the signals received from source 2.

Figure 2:
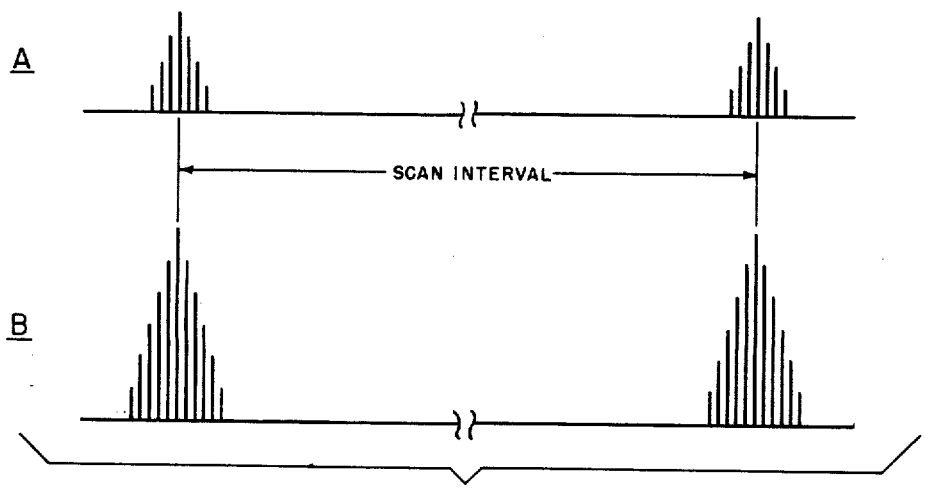
FIG. 2 is a series of pulse diagrams useful in explaining the operation of the preferred embodiment.

It can be shown that the azimuth extent of the radial indication of the PPI is related to the number of detected pulses at the output of pulse former 5 which are produced each time that antenna 1 scans through the azimuth of source 2. The number of pulses produced each time that antenna 1 traverses the bearing of source 2 is determined by the beam pattern of antenna 1, the pulse repetition rate of source 2, the azimuth scanning rate of antenna 1 and the distance separating antennas 1 and 3. Representative groups of pulses which recur each scanning interval of antenna 1 are depicted in diagram A of FIG. 2. Seven pulses are shown within each group for the sake of illustration. If the amplitude of the incoming signals increases such as, for example, where the receiving apparatus of FIG. 1 were located aboard a vehicle approaching source 2, the number of detected pulses at the output of receiver 4 would increase. Additionally, the maximum amplitude of the detected pulses would also increase as shown in diagram B of FIG. 2. As previously mentioned, however, pulse former 5 produces a fixed amplitude and fixed duration pulse in response to each of the detected pulses at the output of receiver 4. Accordingly, only the number of pulses at the output of pulse former 5 increases with decreasing range. The amplitude and duration of the output pulses remain the same. The increased number of pulses causes broadening of the azimuth indication of indicator circuits 9 similar to the result which would have occurred had the directivity of antenna 1 decreased.

Figure 3:
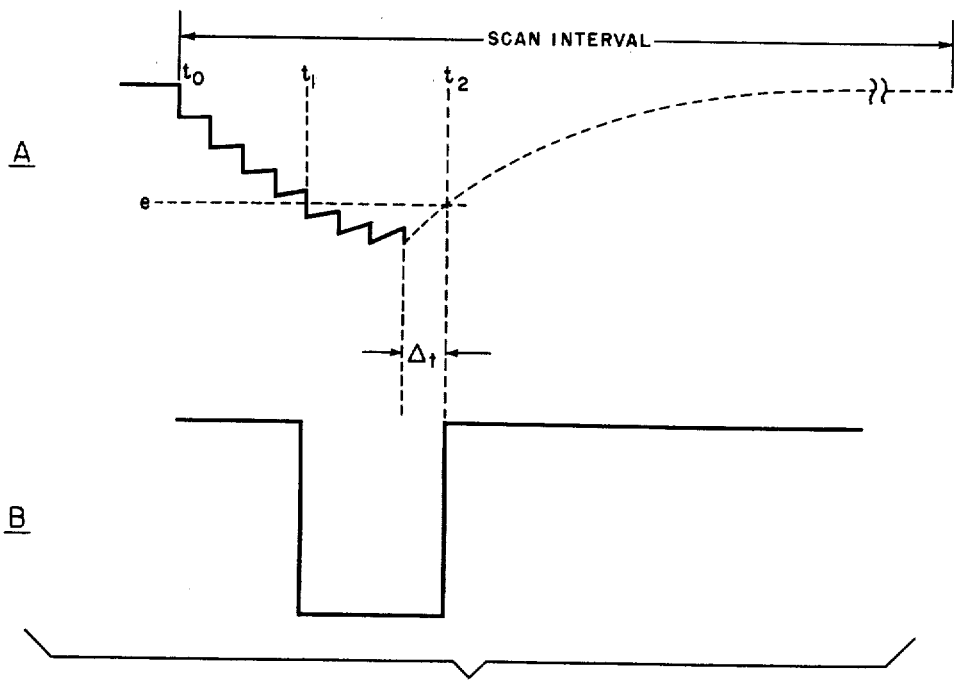
FIG. 3 is a series of waveforms generated within the apparatus of FIG. 1.

The present invention is particularly adapted to avoid any decrease in azimuth resolution of the display produced by indicator circuits 9 irrespective of changes in the strength of the incoming pulsed signals such as would be caused, for example, by range closure between antennas 1 and 3. The pulses appearing across the secondary of transformer 6 are coupled by resistor 11 to diode 12. Diode 12 clips the negative portion of the pulses to produce unipolar positive pulses which then charge the diode-capacitor network 13, 14, 15 and 16. Network 13, 14, 15 and 16 is a conventional "step counter" circuit which produces across capacitor 16 the negative-going "staircase" voltage waveform of FIG. 3A. Each step of the staircase waveform is produced in response to a respective positive pulse appearing across diode 12. After a predetermined number of pulses (adjusted by varying potentiometer 18 which adjusts the nominal positive voltage on the grid of tube 19), voltage $e$ of waveform A of FIG. 3 will be produced on the grid of tube 19.

Tubes 19 and 20 and their associated circuit elements together comprise a conventional Schmitt trigger circuit. As is well understood in the art, said trigger circuit is a two state switching device which is placed in a predetermined one of the states in response to an input voltage above a first threshold value and which reverts to the other of its predetermined states when the input voltage falls below a second threshold value. The input voltage is applied to the grid of tube 19. An output voltage is produced at the plate of tube 20. The first and second threshold values may be made substantially the same to eliminate the "hysteresis" effect by adjustment of resistor 21.

Tube 19 is conducting because of the positive grid potential applied via resistor 17 and determined by the setting of potentiometer 18. Tube 20 is held cut off by the potential drop across cathode resistor 22. The nominal positive voltage on the grid of tube 19 decreases in stepwise fashion as shown in waveform A of FIG. 3 in response to the pulses at the output of pulse former 5. After a predetermined number of pulses (determined by the setting of potentiometer 18), grid cutoff potential will be reached and tube 19 will cease conducting. Tube 20 will commence conduction to produce the negative-going pedestal of waveform B of FIG. 3. Tube 19 will be held cut off for the duration of the pulses in excess of the predetermined number plus an additional time required for the discharge of capacitor 16 through resistor 17 to permit the grid of tube 19 to return to its nominal positive potential as determined by potentiometer 18. In the examples represented in the waveforms of FIG. 3, the predetermined number of pulses required to switch tube 19 is 5. The excess of pulses (above the predetermined number) is three. Thus, the duration of the negative-going pulse of waveform B, FIG. 3, results from an excess of three pulses plus the recovery time $\Delta t$.

The negative pedestal produced at the plate of tube 20 is direct coupled by diode 23 and stored in a long time constant RC circuit 24, 25, 32 to produce on the grid of cathode follower 26 an essential D.-C. potential proportional to the duration of the pedestal at the plate of tube 20. A predetermined proportion of the output D.-C. voltage is selected by resistors 29, 30 and applied via line 31 to control the gain of receiver 4. Potentiometer 27 is adjusted to set the bias initially at zero volts prior to any pulses being received. Diode 28 precludes the receiver gain control bias from becoming positive because of inadvertent misadjustment of potentiometer 27.

In operation, circuit 7 is of the nature of a delayed AGC circuit which produces on line 31 a D.-C. potential proportional to the excess of pulses received during each scan interval of antenna 1 over a predetermined number of pulses selected by the setting of potentiometer 18. As the excess number of pulses increases, so does the gain control bias on line 31. Thus, the number of output pulses produced by pulse former 5 may be maintained substantially constant. Maintenance of a substantially fixed number of pulses per scanning interval of antenna 1, in turn, keeps the azimuth resolution of the display produced by indicator circuits 9 essentially constant.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A pulsed signal receiver comprising means for receiving and detecting incident pulses of electromagnetic energy, means connected to the output of said receiving means for counting the number of detected pulses and for producing an output signal related to the number of said detected pulses in excess of a predetermined number, said predetermined number being greater than zero, and means connected to said counting means and responsive to said output signal for varying the gain of said receiving means in accordance with said output signal.

2. A pulsed signal direction finder receiver comprising means for receiving and detecting incident pulses of electromagnetic energy, said receiving means including a continuously scanning directional antenna and producing groups of detected pulses, each group recurring at the scanning rate of said antenna and the pulses within each said group recurring at the repetition rate of said incident pulses, means connected to the output of said receiving means for counting the number of pulses within each group of detected pulses and for producing an output signal related to the number of said detected pulses in excess of a predetermined number, and means connected to said counting means and responsive to said output signal for varying the gain of said receiving means in accordance with said output signal.

3. A pulsed signal direction finder receiver comprising means for receiving and detecting incident pulses of electromagnetic energy, said receiving means including a continuously scanning directional antenna and producing groups of detected pulses, each group recurring at the scanning rate of said antenna and the pulses within each said group recurring at the repetition rate of said incident pulses, means connected to the output of said receiving means for counting the number of pulses within each group of detected pulses and for producing an output signal having an amplitude related to the number of detected pulses in excess of a predetermined number, and means responsive to said output signal for interconnecting said counting means and said receiving means, said last-named responsive means varying the gain of said receiving means inversely as the amplitude of said output signal.

4. A pulsed signal direction finder receiver comprising means for receiving and detecting incident pulses of electromagnetic energy, said receiving means including a continuously scanning directional antenna and producing groups of detected pulses, each group recurring at the scanning rate of said antenna and the pulses within each said group recurring at the repetition rate of said incident pulses, pulse forming means connected to the output of said receiving and detecting means for producing an output pulse of predetermined amplitude and duration in response to each detected pulse, means connected to the output of said pulse forming means for counting the number of pulses within each group of said output pulses and for producing an output signal having an amplitude related to the number of said output pulses in excess of a predetermined number, and means responsive to said output signal for interconnecting said counting means and said receiving means, said last-named responsive means varying the gain of said receiving means inversely as the amplitude of said output signal.

5. An automatic gain control circuit for use in a receiver of pulses of electromagnetic energy, said pulses recurring at a predetermined repetition rate, comprising means for receiving and detecting said pulses, said detecting means including means for producing an output pulse of the same predetermined amplitude and duration in response to each received pulse, means connected to said detecting means for counting the number of said output pulses and for producing an output signal related to the number of said output pulses in excess of a predetermined number, said predetermined number being greater than zero, and means connected to said counting means and responsive to said output signal for varying the gain of said receiving means in accordance with said output signal.

6. Apparatus as defined in claim 5 wherein said means for counting comprises a diode-capacitor step counter circuit, a two state trigger circuit connected to the output of said counter circuit, and long time constant storage means connected to the output of said trigger circuit.

7. A pulse signal receiver comprising means for receiving and detecting incident groups of pulses of electromagnetic energy, each group recurring at a first rate and the pulses within each group recurring at a second rate higher than said first rate, means connected to the output of said receiving and detecting means for counting the number of pulses within each group of detected pulses and for producing an output signal related to the number of said detected pulses in excess of a predetermined number, said predetermined number being greater than zero, and means connected to said counting means and responsive to said output signal for varying the gain of said receiving means in accordance with said output signal.

8. A pulse signal receiver comprising means for receiving and detecting incident groups of pulses of electromagnetic energy, each group recurring at a first rate and the pulses within each group recurring at a second rate higher than said first rate, pulse forming means connected to the output of said receiving and detecting means for producing an output pulse of the same predetermined amplitude and duration in response to each received pulse, means connected to the output of said pulse forming means for counting the number of said output pulses and for producing an output signal related to the number of said output pulses in excess of a predetermined number, said predetermined number being greater than zero, and means connected to said counting means and responsive to said output signal for varying the gain of said receiving means in accordance with said output signal.

References Cited in the file of this patent
UNITED STATES PATENTS
2,594,916     Gulnac _____ Apr. 29, 1952